United States Patent [19]

Ichigaya et al.

[11] Patent Number: 4,798,992

[45] Date of Patent: Jan. 17, 1989

[54] COLOR CATHODE-RAY TUBE WITH ELECTRON BEAM SELECTION MASK SUPPORT STRUCTURE

[75] Inventors: Hiroshi Ichigaya, Saitama; Susumu Tagawa, Kanagawa; Yasuoshi Sugii; Masanori Ando, both of Tokyo; Jun Yamazaki, Aichi; Yasuo Kawada, Aichi; Tokuho Kinoshita, Aichi; Toshio Shirahama, Aichi; Yoshinori Ito, Tokyo; Eiji Munemoto, Kanagawa, all of Japan

[73] Assignee: Sony Corporation, Tokyo, Japan

[21] Appl. No.: 31,889

[22] Filed: Mar. 30, 1987

[30] Foreign Application Priority Data

May 14, 1986 [JP] Japan ................................ 61-109998
Jul. 29, 1986 [JP] Japan ................................ 61-178182

[51] Int. Cl.⁴ ................................ H02J 29/07

[52] U.S. Cl. ................................ 313/406; 313/269; 313/407

[58] Field of Search ................ 313/406, 407, 404, 269

[56] References Cited

U.S. PATENT DOCUMENTS 3,524,971 8/1970 Schwartz et al. .
3,997,811 12/1976 Tom ................................ 313/404
4,467,241 8/1984 Hines ................................ 313/406 X
4,547,695 10/1985 Rath ................................ 313/406
4,605,878 8/1986 Saita et al. ................................ 313/406
4,670,687 6/1987 Gijrath et al. ................................ 313/407 X

FOREIGN PATENT DOCUMENTS 16575 2/1978 Japan ................................ 313/404
775204 5/1957 United Kingdom .
1304567 1/1973 United Kingdom ................................ 313/406
2081001A 2/1982 United Kingdom .
2129208A 5/1984 United Kingdom .

*Primary Examiner*—Palmer C. DeMeo

[57] ABSTRACT

A color cathode-ray tube where an electron beam selection mask with an aperture grille type beam selection electrode of a thin metal plate attached to a frame is supported by engagement of stud pins with support springs and is thereby positioned stably opposite to a color luminescent screen formed on the inner surface of a panel. A projection is formed on either the top of each stud pin or the bottom of each cap opposed thereto, while a recess is formed in the other for engagement with the projection in the direction orthogonal to the action of the support spring. The mutual contact portions of such projection and recess are coated with solid lubricant films so that the beam selection mask can be reset at its proper position despite any external impact applied thereto. The elasticity constant of the frame is selectively set at a desired value with additional disposition of reinforcing plates having the same thermal expansion coefficient as that of the frame, thereby averting vibration of the beam selection mask. And rotary mechanisms are formed relative to the support springs and are rotated in accordance with thermal expansion of the frame, so that the frame is shifted toward the panel surface having a color luminescent screen thereon, whereby mislanding of the electron beam due to temperature rise in the beam selection mask can be prevented.

7 Claims, 11 Drawing Sheets

COLOR CATHODE-RAY TUBE WITH ELECTRON BEAM SELECTION MASK SUPPORT STRUCTURE

BACKGROUND OF THE INVENTION

1. Field of the Invention

The present invention relates to a color cathode ray tube with an electron beam selection mask disposed opposite to a color luminescent screen and serving to land each electron beam on a fluorescent pattern of a predetermined color formed on the color luminescent screen.

2. Description of the Prior Art

In the conventional color cathode-ray tube known heretofore, as shown in FIG. 15, an electron beam selection means 2 such as an aperture grille having an array of a multiplicity of vertically elongate slit-like electron beam transmission apertures is disposed in a panel 1 where a color luminescent screen is formed on its inner surface. Such electron beam selection means 2 includes, as shown in FIG. 16 for example, an electron beam selection electrode 3 which is composed of a thin metal plate with an array of vertically elongate slit-like apertures 3*a* and is attached in a tensed state to a frame 4. The frame 4 comprises a pair of mutually opposed horizontal members 4A, 4B and a pair of vertical arms 4C, 4D interposed between such horizontal members 4A, 4B. And the electron beam selection electrode 3 is disposed with an adequate tension between the frame members 4A and 4B while being anchored at the respective two ends of the individual slit-like apertures 3*a*.

In general, since the fluorescer pattern of each color is optically printed by the use of such electron beam selection means 2 as an optical mask, it is necessary that the beam selection means 2 be so attached to the panel 1 as to be removable therefrom and reattachable at a predetermined position. Furthermore, when any external impact is applied after completion of the cathode-ray tube as a final product, the electron beam selection mask 2 needs to be returned to the former predetermined position. Normally, therefore, attachment of the beam selection mask 2 is executed by engaging support stud pins 5, which are anchored on peripheral side walls 1s of the panel 1, with leaf springs 6 secured to the frame 4 of the mask 2. For example, the springs 6 are welded at one end thereof to the mutually opposed vertical arms 4C, 4D and the horizontal frame member 4B of the frame 4 respectively, and the stud pins 5 fixed by frit on the inner surface of the panel 1 are fitted into through-holes 7 formed at the respective free ends of the springs 6, whereby the mask 2 is held at a predetermined position detachably.

The stud pin 5 is composed of a ceramic material or the like and is shaped into a truncated cone, and the through-hole 7 of the spring 6 is selectively shaped to have three sides 7A, 7B, 7C which contact the peripheral surface of the stud pin 5 as shown in FIGS. 17 and 18, so that the stud pin 5 is kept in contact with the inner periphery of the through-hole 7 at three points PA, PB, PC on the sides 7A, 7B, 7C respectively, whereby the positions of engagement between the stud pin 5 and the spring 6 are established.

Due to the constitution mentioned above, in case the cathode-ray tube becomes dimensionally greater as observed in the recent trend of production, the electron beam selection mask 2 is also rendered larger in both size and weight, hence raising a problem with regard to reliability. That is, when any great external impact is applied to such a structure, there is induced a positional deviation between the stud pin 5 and the support spring 6 and, even after removal of the impact, the positional relationship between the above two components fails to resume the former stable state prior to the impact and the positional deviation still remains as a result. This phenomenon will be described below in further detail. Suppose now that in FIG. 17, the support spring 6 is inclined, by an external impact, with respect to the stud pin 5 from a line passing through one contact point PC and the center axis 0 of the stud pin 5. If the stud pin 5 is conical in this case, a local shock is caused at the other contact point PA or PB where a displacement is induced in the direction to thrust toward a larger-diameter base portion of the stud pin 5. Meanwhile, if the stud pin 5 is columnar with its portions having an equal diameter, a local shock is caused at the two points PA and PB. Particularly when the electron beam selection mask 2 is great in both size and weight as mentioned above, the stud pin 5 is also shaped to have a larger diameter, so that the distance from the center axis 0 of the stud pin 5 to the point PA or PB becomes longer to consequently increase the moment even if the coefficient of friction remains constant. And since the impact is rendered greater with increase of the weight, it follows that the aforesaid local shock also becomes greater. Thus, even after release from the external impact, there occurs a trouble that the inclination of the support spring 6 is not eliminated because of the friction, or even after successful elimination of the inclination, the inner periphery of the through-hole 7 in the support spring 6 is worn or damaged by the aforementioned local shock and is thereby deformed in the contour, so that the positional relationship between the stud pin 5 and the through-hole 7 in the support spring 6 fails to resume the former state or position prior to application of the impact.

Once such positional deviation is thus induced between the stud pin 5 and the through-hole 7 of the support spring 6, it causes a positional error in the relationship between the electron beam selection mask 2 and the color luminescent screen to eventually bring about disadvantages including occurrence of mislanding of the electron beam which generates color discrepancy.

Furthermore, in the constitution where the beam selection electrode in the color cathode-ray tube has an array of slit-like electron beam transmission apertures 3*a* extending in one direction (hereinafter referred to as Y-direction) as described above, there may occur a trouble that some external vibration based on the sound from a speaker or the like is imparted to the beam selection electrode 3 to vibrate the same, thereby causing "shake" in the electron beam transmission apertures 3*a* to eventually deteriorate the picture quality.

It is customary in the prior art that the harmful influence of such vibration in the electron beam selection electrode 3 is diminished by increasing both the mechanical strength of the frame 4 and the tension for support of the electrode 3 to render the vibration damping characteristic steep.

Besides the above, in the color cathode-ray tube equipped with such electron beam selection mask 2, the beam path is limited by the beam selection electrode 3 during the operation so that the electron beam fails to pass through the aperture 3*a* and consequently the electrons come to impinge upon the electrode 3 itself. As a result, the beam selection mask 2 is heated up to a considerably high temperature to cause thermal expansion of the beam selection electrode 3, whereby an error is induced relative to the landing position of the electron beam on the luminescent screen. This phenomenon will be described below with reference to FIG. 19. Suppose now that a single electron beam 8 corresponding to one color such as red passes through a slit-like beam transmission aperture 3a in the beam selection electrode 3 shown by solid lines and lands on a striped red fluorescer pattern 9R of the color luminescent screen 9 formed on a front surface 1f of the panel 1. If the structure is so designed that, at normal temperature, the electron beam 8 lands exactly on the fluorescer pattern 9R through the slit-like beam transmission aperture 3a in the beam selection electrode 3, then, as mentioned previously, the electron beam selection mask 2 is heated during the operation of the cathode-ray tube and is thereby expanded thermally, so that the electron beam transmission aperture 3a is displaced horizontally in the direction of arrows 11a and 11b as shown by chain lines in FIG. 19. Consequently, the landing position of the electron beam on the luminescent screen 9 deviates from the relevant pattern 9R and varies to a fluorescer pattern of another color as indicated by chain-line arrows to eventually cause color discrepancy. This phenomenon is conspicuous particularly in the peripheral regions of the screen where the displacement resulting from the thermal expansion is great. For averting such disadvantage, the space termed "bar height" between the electrode 3 and the luminescent screen 9 is changed with the thermal expansion of the electrode 3 from an initial bar height h1 to a required small bar height h2 as shown by broken lines in FIG. 19 in accordance with the thermal expansion or temperature rise, whereby the displacement to the landing position on the luminescent screen 9 can be avoided.

Relative to the constitution described in connection with FIG. 15, there is known on method of changing the bar height or the space between the electrode and the luminescent screen in accordance with the temperature rise, wherein each of the springs employed to support the frame 4 of the electron beam selection electrode 3 is formed into a bimetal structure so that the temperature can be sensed therefrom for adjustment of the space between the electrode and the luminescent screen. However, since the above known technique is not capable of discriminating between the ambient temperature variation and the electrode temperature variation, there is a problem that even when substantially no change is existent in the positional relationship between the electrode 3 and the luminescent screen 9, the space therebetween is changed indiscriminatively to induce a color discrepancy if the sensed temperature variation is the ambient one.

SUMMARY OF THE INVENTION

The present invention is so contrived as to avert the aforementioned disadvantages in the constitution where an electron beam selection mask is supported by engagement of stud pins with support springs and also to achieve exact positioning of an electron beam selection mask with respect to a panel.

Furthermore, the present invention effectively eliminates vibration of the electron beam selection electrode 3 that may result from any external vibration of a speaker or the like, thereby solving the aforesaid problem of shake of the electron beam transmission apertures 3a. And in the constitution designed to solve another problem of mislanding of the electron beam due temperature rise in the beam selection mask 2, its function can be performed with certainty.

The present applicant previously provided a color cathode-ray tube as disclosed in Japanese Patent Application No. 61 (1986)-118292, wherein the problem of "shake" of electron beam transmission apertures is solved by specifying the relationship between the elasticity constant of each spring and that of the frame used to attach the electron beam selection electrode to the panel of the cathode-ray tube, on the basis of the study that "shake" of the electron beam selection electrode due to external vibration and hence "shake" of the electron beam transmission apertures is caused by the elastic deformation and vibration of the frame of the beam selection electrode that result from external vibration. The present applicant also provided another color cathode-ray tube as disclosed in Japanese Patent Application No. 60 (1985)-291434, wherein springs used for attaching the electron beam selection electrode to the panel of the cathode-ray tube are furnished with a particular function for the purpose of preventing occurrence of mislanding of the electron beam by automatic adjustment of the bar height in accordance with temperature rise in the electron beam selection electrode.

The present invention is capable of performing with certainty the aforesaid respective functions of the color cathode-ray tubes previously invented, such as prevention of shake of the electron beam transmission apertures, adjustment of the bar height in accordance with temperature rise and so forth.

In the present invention where the electron beam selection mask is attached to the panel of the cathode ray tube by engagement of stud pins with support springs, a cap is mounted on each support spring to cover the corresponding stud pin, and a projection and a recess are formed respectively on the top of the stud pin and the bottom of the cap in such a manner as to be engageable with each other. And the mutual contact portions thereof are coated with a solid lubricant such as gold Au, silver Ag or boron nitride BN to reduce the friction resistance of the two components in a high vacuum so that, when any great external impact is applied in a high vacuum during manufacture of the cathode-ray tube or even after completion as a product, the electron beam selection mask can be reset at its predetermined position upon removal of the impact while breakage of the projection can be averted.

In another feature of the present invention relative to the constitution where the electron beam selection mask is attached to the panel of the cathode ray tube through springs, the elasticity constant of the frame can be selectively set at a desired value, with the elasticity constant of the springs taken into consideration, by additionally disposing a reinforcing plate on the lateral surface of the frame of the electron beam selection mask, thereby averting vibration of the beam selection mask and ensuring exact adjustment of the bar height in accordance with temperature rise in the beam selection mask.

DETAILED DESCRIPTION OF THE PREFERRED EMBODIMENTS

Figure 1:
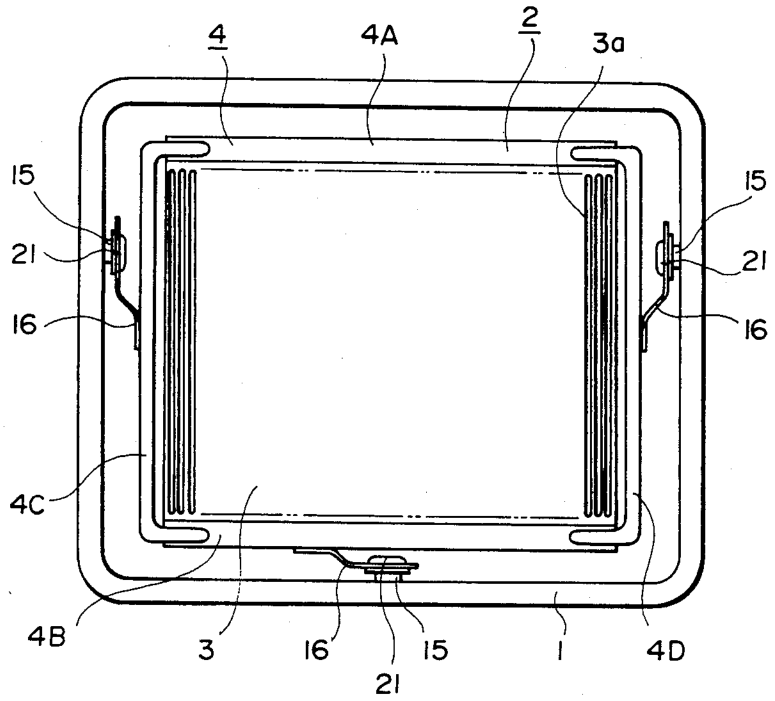
FIGS. 1 and 6 are rear views each showing exemplary attachment of an electron beam selection mask in a color cathode-ray tube according to the present invention.
Figure 2:
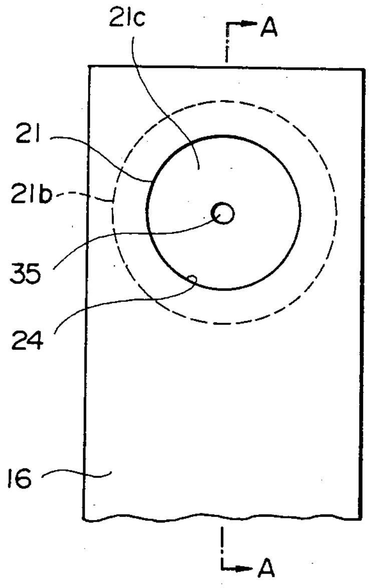
FIG. 2 is a plan view showing exemplary engagement of a stud pin with a support spring.
Figure 3:
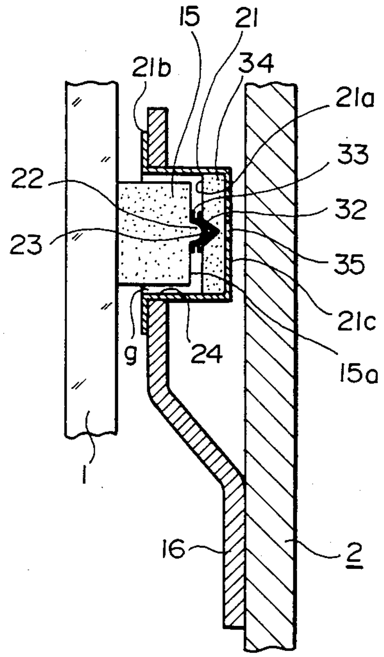
FIG. 3 is a sectional view taken along the line A—A in FIG. 2.

In the present invention, as illustrated in a rear view of FIG. 1 showing exemplary attachment of an electron beam selection mask 2 to a panel 1, a plan view of FIG. 2 showing exemplary engagement of a stud pin with a support spring and a sectional view of FIG. 3 taken along the line A—A in FIG. 2: positioning stud pins 15 are fixed by frit to either the panel 1 of the color cathode-ray tube where the electron beam selection mask 2 is to be attached, or the frame 4 of the mask 2; while support springs 16 to be engaged with the stud pins 15 are anchored to the frame 4 or the panel 1. Each of the support springs 16 has a cap 21 to cover the top of the stud pin 15. And a projection 22 is formed on the center axis of either the top 15*a* of the stud pin 15 or the bottom 21*a* of the cap 21 opposed to the top 15*a*. Meanwhile, a recess 23 is formed in the other for engagement with the projection 22 in the direction orthogonal to the action of the support spring 16. Each of such projection 22 and recess 23 is so shaped as to have a vertex on its center axis in such a manner that a point of stable engagement is positioned on the center axis. In this state of engagement, a gap g is maintained between the cap 21 and the stud pin 15 so that the support spring 16 is permitted to swing or rotate slightly with respect to the stud pin 15 on the point of engagement between the projection 22 and the recess 23, or the projection 22 is permitted to shift onto the peripheral edge of the recess 23. If such swing, rotation or shift is caused in this structure by any impact or the like, the outer peripheral surface of the stud pin 15 and the inner peripheral surface of the cap 21 or the inner peripheral edge of its opening come to butt against each other through surface contact or line contact.

In the present invention, as shown in FIG. 3, at least the respective contact regions of the mutually engaged projection 22 and recess 23 including the slide contact portions thereof at the individual regular positions of engagement and those after the aforesaid swing or rotation are coated with solid lubricant films 32 and 33 composed of gold Au, silver Ag or boron nitride BN.

However, if the color cathode-ray tube of such constitution is dimensionally enlarged with resultant increase in the weight of the electron beam selection mask 2, there may occur a trouble that the projection 22 is damaged by some external great impact in case the friction coefficient of the contact portions of the projection 22 and the recess 23 cannot be sufficiently reduced.

Figure 4:
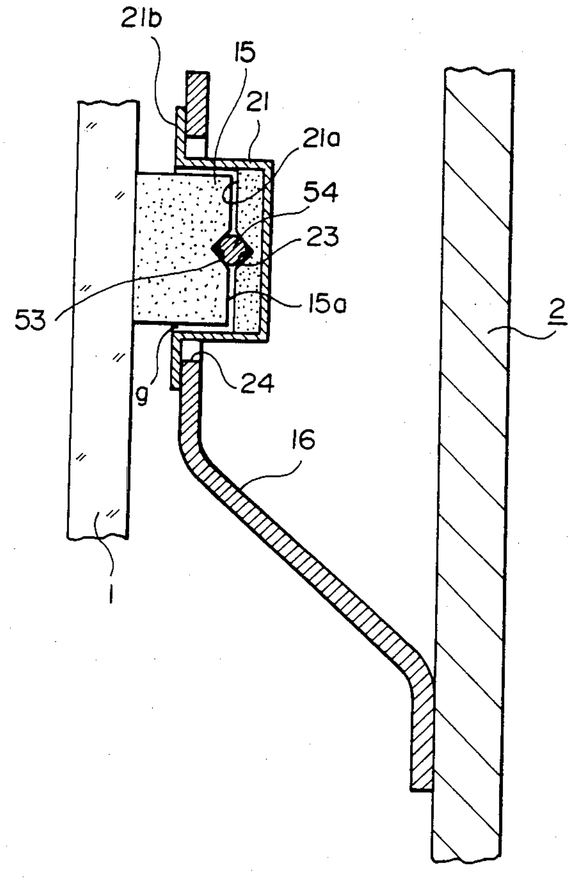
FIG. 4 is a sectional view of a state where a ball is retained.

For the purpose of averting such disadvantage and achieving the same effect as that of the above-mentioned projection and recess, another feature of the present invention resides in that, as shown in FIG. 4, conical recesses 53 and 23 are formed on the respective center axes of the top 15*a* of the stud pin 15 and the bottom 21*a* of the cap 21, and a metal ball 54 is retained in the two recesses 53 and 23. The metal ball 54 is composed of a magnetic material or the like and has an adequate diameter so selected that the ball can be in line contact with the inner surface of the recesses 53 and 23 respectively while maintaining a small gap between the top 15 and the bottom 21*a*. In this case also, the portions of the ball 54 to be in contact with the recesses 53 and 23 may be coated with the aforementioned solid lubricant film, although not shown.

Figure 7:
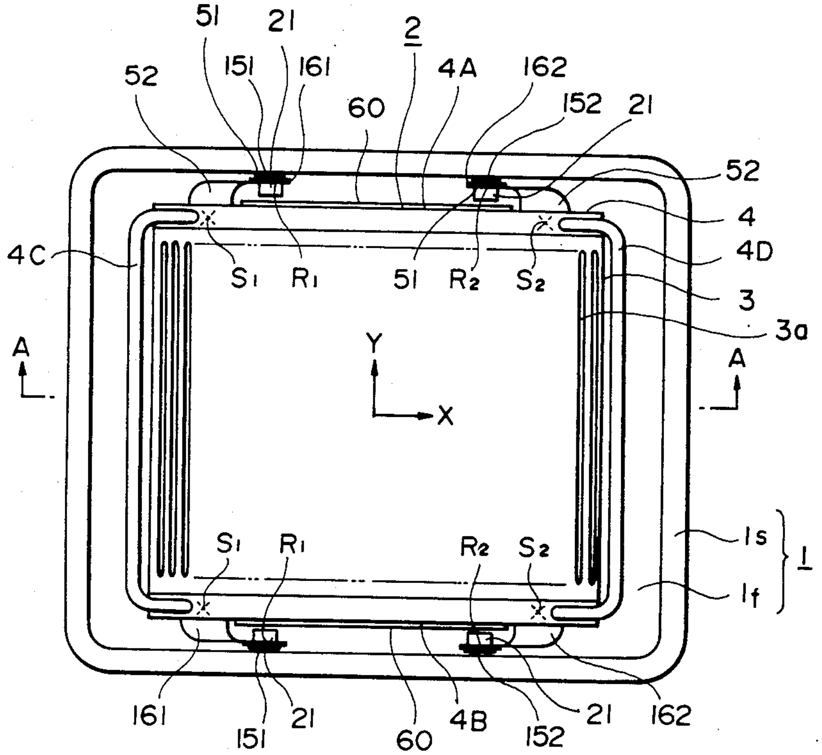
FIG. 7 is a rear view showing exemplary attachment of an electron beam selection mask in the color cathode-ray tube of the invention.
Figure 8:
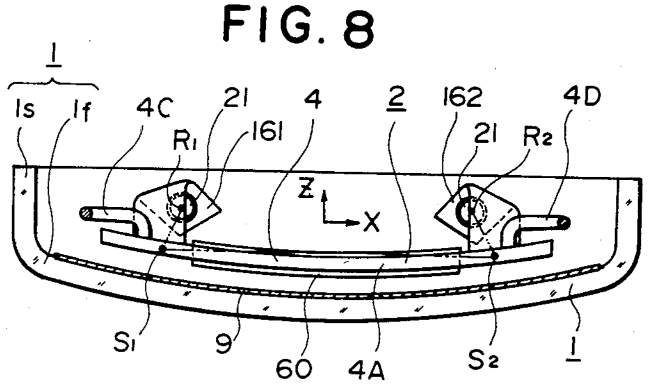
FIG. 8 is a sectional view taken along the line A—A in FIG. 7.
Figure 9:
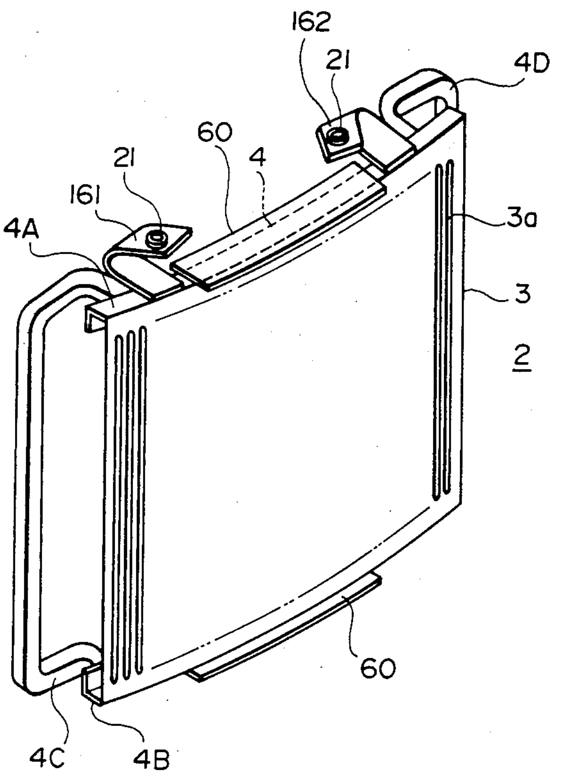
FIG. 9 is a perspective view of the electron beam selection mask.

Furthermore, in the cathode-ray tube according to the present invention, as shown in FIGS. 7 through 9, an electron beam selection mask 2 is attached through springs 161 and 162 opposite to a color luminescent screen 9 formed on the inner surface of the panel 1, and an electron beam selection electrode 3 composed of a thin metal plate with an array of beam transmission apertures is attached with tension to a frame 4. In this structure, lateral surfaces of the frame 4 are furnished with reinforcing plates 60 having the same thermal expansion coefficient as that of the frame 4. Each of the plates 60 has a selected width larger than the depth of the lateral surface of the frame 4, and the elasticity constant of the frame 4 is adjusted properly in relation to the elasticity constant of the springs 161 and 162.

In the electron beam selection mask 2, the beam selection electrode 3 disposed with tension between mutually opposed horizontal members 4A and 4B of the frame 4 is composed of a thin metal plate with a multiplicity of slit-like beam transmission apertures 3*a* extending in the Y-direction which is orthogonal to the frame members 4A and 4B.

And pairs of springs 161 and 162 are anchored to such mutually opposed horizontal members 4A and 4B of the frame 4. In the frame members 4A and 4B, each pair of the springs 161 and 162 are positioned on the left and right symmetrically with respect to the center of each frame member in the longitudinal direction thereof, and the upper and lower pairs are disposed at mutually symmetrical positions with respect to the center of the frame 4. Such two pairs of springs 161 and 162 are engaged with pairs of stud pins 151 and 152 disposed correspondingly thereto on the peripheral side walls 1s of the panel 1, whereby the beam selection mask 2 is attached to the panel 1. And the restoring force of the springs 161 and 162 is specified in relation to that of the frame 4.

Here the direction of extension of the electron beam transmission apertures 3*a* is defined as Y-direction, the axial direction of the cathode-ray tube is defined as Z-direction, and the direction orthogonal to the Y- and Z-directions is defined as X-direction. Then the elasticity constant (load required for causing a unitary value of deformation) in each of the X-, Y-, Z-directions between anchor points S1, S2 of the springs 161, 162 on the frame members 4A, 4B and engagement points R1, R2 of the springs 161, 162 is selectively set to be sufficiently smaller, at least ½ or less, than the elasticity constant in each of the X-, Y-, Z-directions between anchor points S1, S2 of the adjacent springs 161, 162 forming a pair on the individual common frame members 4A, 4B. In other words, the restoring force in each of the X-, Y-, Z-directions between the points S1, R1 of the springs 161, 162 and also between the points S2, R2 thereof is set to be smaller than the restoring force in each of the X-, Y-, Z-directions between the points S1, S2 on the individual members 4A, 4B of the frame 4.

Practically the springs 161 and 162 need to have a great elasticity constant due to the necessity of supporting the mask 2 which includes the heavy-weight frame 4 of iron or the like, so that the aforesaid elasticity constant of the frame 4 becomes a considerably great value. In the present invention, such great required elasticity constant of the frame 4 in its members 4A and 4B is obtained by additionally joining a reinforcing plate to the lateral surface thereof.

In the constitution where support springs 161 and 162 are disposed between the upper and lower members 4A, 4B of the frame 4 and the horizontal surfaces of the peripheral walls 1s of the panel 1 opposed to the frame members, the elastic action of the support springs 161 and 162 is essentially exerted in the Y-direction. Therefore, in comparison with the Y-direction elasticity constant between the points S1 and R1 and also that between the points S2 and R2 of the pair of springs 161 and 162, the Y-direction elasticity constant of the frame 4 between the anchor points S1 and S1 of the mutually opposed springs 161 and 161 and also that between the anchor points S2 and S2 of the mutually opposed springs 162 and 162 on the frame members 4A and 4B are set to be sufficiently smaller without the necessity of reinforcement effect of the plates 60 as in any ordinary structure.

In the constitution of the present invention where attachment of the electron beam selection mask 2 to the panel 1 is achieved by engaging the stud pins 15 with the support springs 16, the mask 2 is freely detachable from the panel 1, and any external impact can be alleviated by the elasticity of the support springs 16. Positional setting of the electron beam selection mask 2 on the panel 1 is executed by means of point support which is based on engagement of projections 22 of the stud pins 15 with recesses 23 of the support springs 16, so that when any great external impact is applied, each support spring 16 is swung or rotated on the portion of engagement between the projection 22 and the recess 23, or the projection 22 is shifted onto the peripheral edge of the recess 23. Consequently, the shock resulting from such external impact occurs in a relatively large area between the inner peripheral surface of the cap 21 or the inner peripheral edge of its opening and the outer peripheral surface of the stud pin 15, so that the great external impact is received principally in such area to eventually solve the aforementioned problems regarding local collision between the stud pin 15 and the support spring 16. Further in the present invention where the mutual contact portions of the projection 22 and the recess 23 are coated with solid lubricant films 32 and 33 respectively, slide contact therebetween is effected with a slight frictional resistance so that, in case any great external impact is applied, the aforesaid swing, rotation or shift of the engaged portion is caused smoothly. And after removal of such external impact, the former state of engagement can be restored with certainty. As known well, friction induced in a vacuum is far greater than in the air. Therefore, in a completed cathode-ray tube where a high vacuum degree is maintained, it is unavoidable that considerable friction is produced even if the projection 22 and the recess 23 are composed of a ceramic material or a combination of ceramic and metallic materials having a relatively small friction coefficient in the air. Accordingly, when a positional deviation is about to occur between the projection 22 and the recess 23 due to an external impact, there arises a trouble that the projection 22 is damaged by the great frictional resistance between the projection 22 and the recess 23 or the relative position of engagement therebetween fails to return to the former proper position. In the present invention, however, such disadvantage can be averted as the mutual contact portions of the projection 22 and the recess 23 are coated with solid lubricant films 32 and 33 respectively.

Besides the above, in the present invention where abutment between the stud pin 15 and the cap 21 of the support spring 16 is effected through a ball 54 as mentioned previously, a high-strength metal is usable for such ball 54 and, due to the spherical shape, the ball 54 is movable with rotation even in a heavy-weight electron beam selection mask when any positional deviation is caused between the stud pin 15 and the cap 21 due to a great impact, thereby performing the same function as in the structure described previously in connection with FIG. 8 to eventually prevent breakage.

Moreover, by virtue of the above constitution where reinforcing plates 60 are joined to horizontal members 4A and 4B of the frame 4 to which the springs 161 and 162 are anchored, the elasticity constant of the frame members 4A and 4B can be increased with respect to the surface direction of such reinforcing plates 60. Consequently, in the structure where the electron beam selection mask 2 is attached through pairs of springs 161 and 162 to the panel 1, if such springs 161 and 162 are so selected as to have a sufficient strength for supporting the mask 2 on the panel 1 or if the elasticity constant of the springs is set at a great value for resuming the former state despite any great external impact, it is possible to determine the elasticity of the springs in each of the X-, Y-, Z-directions to be smaller than that of the frame 4 in each of the above three directions by increasing the elasticity constant of specific portions of the frame 4. Therefore, when any external vibration from a speaker or the like exerts some unbalanced force on the frame 4 via the springs 161 and 162 from the stud pins 151 and 152, the springs 161 and 162 are elastically deformed to absorb such unbalanced force so that the frame 4 is kept substantially free from vibration based on elastic deformation, particularly from generation of low-frequency vibration. Consequently it becomes possible to achieve certain prevention of any vibration of the electron beam selection electrode 3 that is based on the vibration of a speaker or the like, hence averting shake in the electron beam transmission apertures 3*a*.

And the elasticity constant of specific portions of the frame 4 can be increased due to the additional provision of reinforcing plates 60, thereby avoiding a disadvantage which brings about larger weight of the frame 4 as a result of thickening it to increase the elasticity constant thereof. Since the elasticity constant of the reinforcing plate 60 in its surface direction is proportional to the cube of its width, the effect of increasing the elasticity constant attained by additional provision of the reinforcing plate to the frame 4 is remarkably great. In an example where a reinforcing plate 60 having a transverse width of 24 mm is joined to each of the horizontal members 4A and 4B of the frame 4 having a transverse width of 14 mm, the result becomes $(24/14)^3=5$ which denotes that the elasticity constant increases about five times.

Hereinafter a preferred embodiment of the present invention will be described in further detail with reference to FIGS. 1 through 10, which show an exemplary case of applying the invention to a color cathode-ray tube having an electron beam selection mask 2 of aperture grille type. In this embodiment, as will be obvious from the following detailed description, occurrence of mislanding of each electron beam due to temperature rise is prevented by automatically adjusting a bar height which is the space between a luminescent screen and an electron beam selection mask and is varied by the temperature rise.

In this embodiment also, as mentioned previously in connection with FIGS. 15 through 18, an aperture grille type electron beam selection mask 2 is disposed in a panel 1 of the cathode-ray tube where a color luminescent screen is formed on its inner surface. The electron beam selection mask 2 consists of an aperture grille in which an electron beam selection electrode 3 composed of a thin metal plate with an array of vertically elongate slit-like electron beam transmission apertures 3*a* is attached with tension to a frame 4. The frame 4 comprises a pair of mutually opposed horizontal members 4A, 4B and a pair of vertical arms 4C, 4D interposed between such frame members 4A, 4B. And the electron beam selection electrode 3 is attached with tension between the frame members 4A and 4B.

In this embodiment, support springs 16 are welded at one end thereof to the mutually opposed arms 4C, 4D and the horizontal member 4B of the frame 4, while the free ends of the support springs 16 are engaged with stud pins 15 fixed by frit to the inner surface of the panel 1 respectively, whereby the electrode 3 can be retained at a predetermined position in a detachable manner.

Each of the stud pins 15 is shaped into a column or a cylinder with a bottom and is composed of a ceramic material such as forsterite or a metallic material such as 426 alloy which is approximately equal in thermal expansion coefficient to the glass of the panel 1 where the pin 15 is disposed. The free end of each support spring 16 has a cap 21 to cover the stud pin 15. Although the cap 21 may be produced integrally with the support spring 16 by drawing work or the like, it may also be produced, as shown in FIG. 3, by first making a metal cap with a flange 21*b* separately from the support spring 16 by press work out of stainless steel 304 or the like, then fitting the metal cap into a through-hole 24 formed at the free end of the support spring 16, and subsequently welding the flange 21*b* to the support spring 16 composed of SUS610 or the like.

On the center axis of the top 15*a* of the stud pin 15, there is formed a projection 22 integrally with the stud pin 15.

Meanwhile, a recess 23 for receiving the projection 22 therein is formed on the center axis of the bottom 21*a* of the cap 21. Although the recess 23 may be formed in the bottom 21*a* itself of the cap 21 by press work or the like, it may also be formed, as shown in FIG. 3, by forcibly pressing into the cap 21 a disc-like plate 34 which is composed of a ceramic material such as alumina having a small friction coefficient against the projection 22, and then forming a recess 23 at the center of such seat plate 34.

In this case, at least one air vent 35 is formed in a bottom plate 21*c* of the cap 21 into which the seat plate 34 is forcibly pressed.

And particularly in this invention, the surface of the aforesaid projection 22 and recess 23 are coated with solid lubricant films 32 and 33 composed of gold, silver, boron nitride or the like. When the material of the stud pin 15 and the seat plate 34 is ceramic such as forsterite or alumina in the embodiment illustrated, the outer surface of each projection 22 and the inner surface of each recess 23 are coated with frit type thick layers of gold or silver paste, which are then baked in a temperature range of 800° to 900° C. to form solid lubricant films 32 and 33 each having a thickness of 15 to 20 microns. In case the projection 22 and the recess 23 are composed of a metallic material, the films 32 and 33 can be formed by electroplating.

Figure 10:
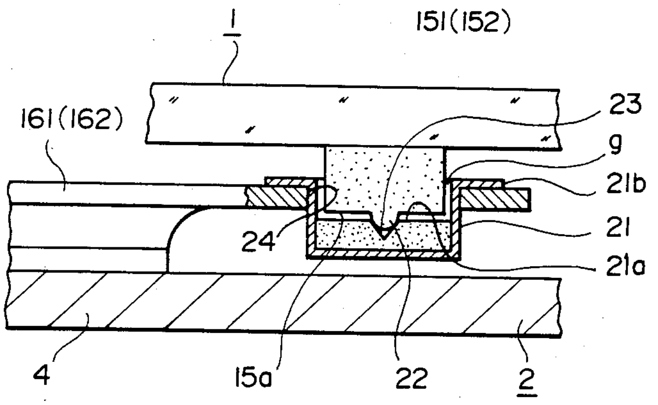
FIG. 10 is a sectional view showing engagement of a stud pin.

Such projection 22 and recess 23 are so contrived that the vertexes thereof are positioned exactly on the respective center axes of the stud pin 15 and the cap 21 so as to ensure stable engagement. The projection 22 and the recess 23 may be formed into a variety of modified shapes. For example, as shown in FIGS. 3 and 10, the projection 22 is shaped to be spherical while the recess 23 is shaped to be conical. In case the stud pin 15 has a height of 6 mm (without including the height of the projection 22) and a diameter of 13 mm, the projection 22 is shaped to be semispherical with a diameter of 2.6 mm. That is, the height of the projection 22 is set to 1.3 mm, the depth of the triangular pyramidal recess 23 to 1.5 mm, and the diameter of its opening to 3.0 mm, respectively. In this case, the stud pin 15 is inserted into the cap 21 by a depth of 2 mm or so from the top surface of the pin 15 without including the height of the projection 22, and the gap g between the cap 21 and the stud pin 15 is set to 0.5 mm or so in a normal state.

Figure 5A:
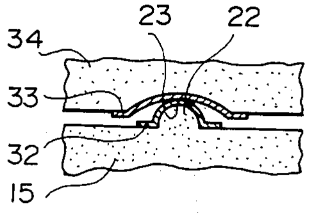
FIGS. 5A and 5B are sectional views each showing exemplary engagement of a projection with a recess.
Figure 5B:
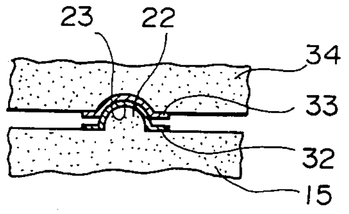

The shape of the projection 22 is not limited to a sphere alone, and it may have a parabolic surface or any of other suitable shapes as well. Similarly, the recess 23 may be modified to have a gently extending spherical or conical surface as illustrated in FIG. 5A, or a curved surface which is equal in radius of curvature to the projection 22 as illustrated in FIG. 5B. In any of such cases, the shapes of the projection 22 and the recess 23 need to be so determined that, when the stud pin 15 and the support spring 16 are relatively displaced and the respective center axes of the stud pin 15 and the cap 21 become substantially parallel to each other, the projection 22 is shifted onto the opening edge of the recess 23.

Further in the present invention, as shown in FIG. 4, a recess 53 is formed integrally with the stud pin 15 on the center axis of its top 15*a* at the time of producing the stud pin 15, so as to prevent breakage of the projection.

Meanwhile, another recess 23 is formed on the center axis of the bottom 21*a* of the cap 21. The recess 23 may be formed by press work or the like directly in the bottom 21*a* of the cap 21, but it is also possible to form such recess 23 at the center of a disc which is composed of a ceramic or similar material having a small frictional resistance against the projection 22 and is pressed forcibly into the cap 21.

And a metal ball 54 is retained in the recesses 53 and 23.

Figure 6:
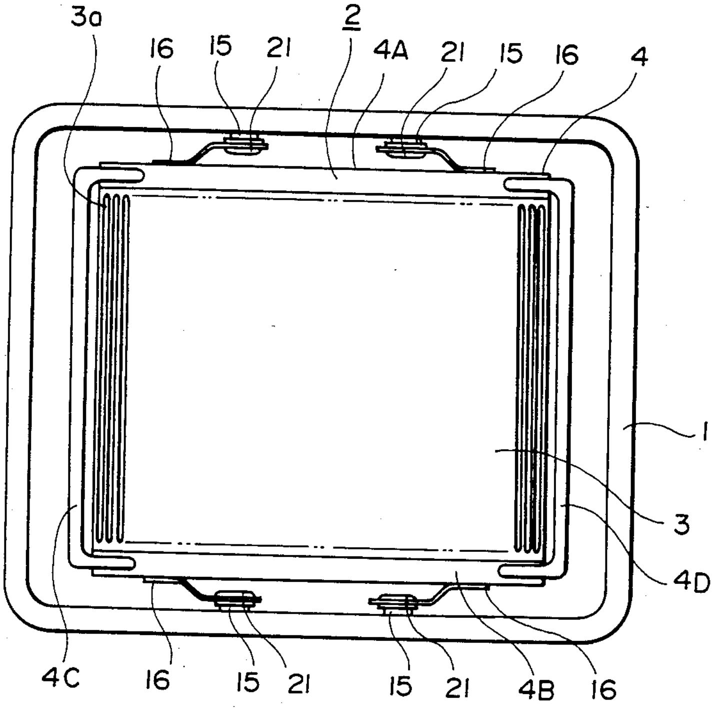

In the example illustrated, attachment is executed by engaging the stud pins 15 with the support springs 16 at three points on the left, right and lower sides of the frame 4. However, the disposition for attachment is not limited to such example alone and, in a large-sized tube, as illustrated in FIG. 6, it is desired that two points of engagement between the stud pins 15 and the support springs 16 be arranged on each of upper and lower horizontal members of the frame 4.

Similarly, as illustrated in FIG. 7, reinforcing plates 60 are welded along the outer surfaces of the upper and lower horizontal members 4A and 4B of the frame 4 opposed to each other. The reinforcing plates 60 are composed of the same material as that of the frame 4, such as iron.

And support springs 161 and 162 such as band-shaped leaf springs are welded at one end thereof to the horizontal frame members 4A and 4B at symmetrical positions on the left and right.

In FIGS. 7 through 10, the components corresponding to those shown in FIGS. 15 through 18 are denoted by the same reference numerals, and a repeated description is omitted here. In relation to such support springs 161 and 162, first and second rotary mechanisms 51 and 52 are dispose in the vicinities of stud pins 151 and 152 and also in the vicinities of anchor positions of the springs 161 and 162 on the horizontal members of the frame 4, in such a manner as to be rotatable on the respective axes of the stud pins 151 and 152.

The first rotary mechanism 51 is swingable on the axis of the stud pin 151 (152) at the position of engagement between the cap 21 located at the free end of the spring 161 (162) and the stud pin 151 (152) fixed by frit at the corresponding position on the panel 1.

In such a structure, mutual contact portions of the projection 22 and the recess 23 are coated with solid lubricant films 32 and 33 so as to smoothen the rotation of the first rotary mechanism 51.

Figure 13A:
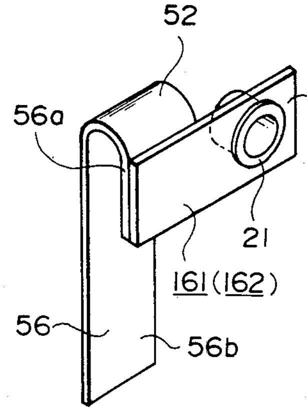
FIGS. 13A through 13C are perspective views of support springs.
Figure 13B:
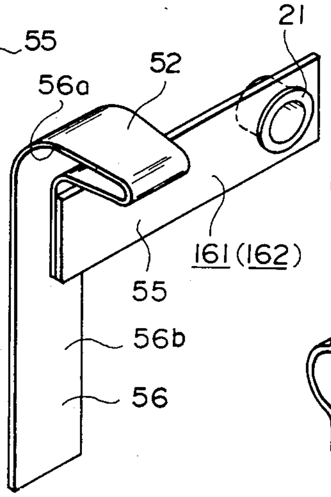
Figure 13C:
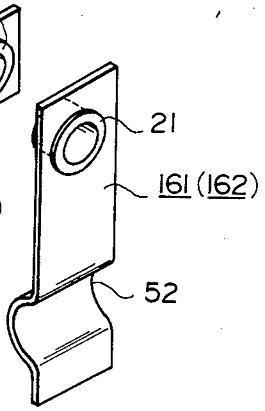

Meanwhile in the second rotary mechanism 52, as shown in FIGS. 7 through 9, each support leaf spring 161 (162) is composed of a plate portion extending backward from the frame 4 and a curved or flexed portion folded back obliquely therefrom; or, as shown in FIGS. 13A and 13B, each spring 161 (162) is composed of a body 55 engageable with the stud pin 151 (152) and a holder 56 consisting of a leaf spring, wherein the spring body 55 is attached to one end 56*a* of the holder 56 whose other end 56*b* is anchored to the frame 4 by welding or the like, and a curved or flexed portion is formed in such holder. In another example, as shown in FIG. 13C, the second rotary mechanism 52 is constituted by forming a corrugation in the spring 161 (162). Thus, a variety of constitutions can be contrived with regard to such rotary mechanism.

The pairs of springs 161 and 162 having the above-described structure exert elasticity in each of the X-, Y-, Z-directions, and the elasticity constant of each spring is specified in relation to that of the frame 4 as mentioned previously. The elasticity constant in each of the X-, Y-, Z-directions between anchor points S1, S2 of the springs 161, 162 on the frame members 4A, 4B and engagement points R1, R2 of the springs 161, 162 is selectively set to be sufficiently smaller, at least ½ or less, than the elasticity constant in each of the X-, Y-, Z-directions between anchor points S1, S2 of the pair of springs 161, 162 on the common frame members 4A, 4B. When setting the elasticity constant in such relationship particularly with respect to the Z-direction, a high degree of freedom is attainable by properly selecting the transverse width of the reinforcing plate 60 in the Z-direction.

Figure 11:
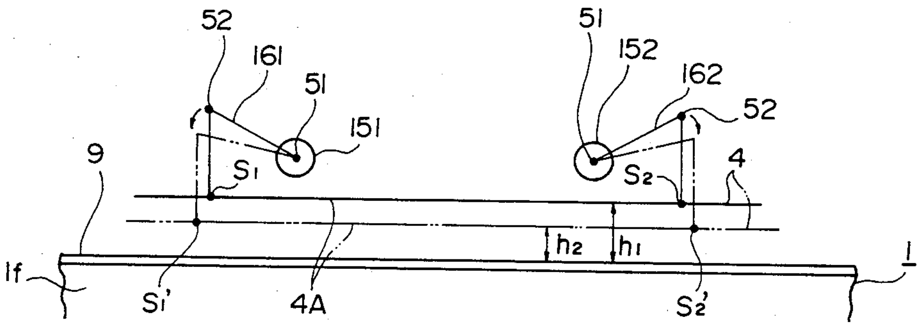
FIG. 11 illustrates the operation performed in the present invention.
Figure 12:
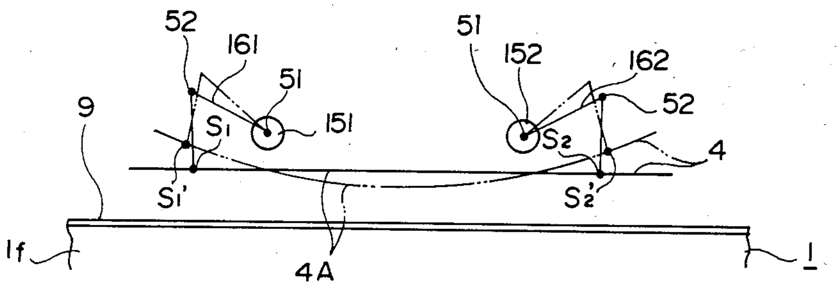
FIG. 12 illustrates a comparison of the operation.
Figure 19:
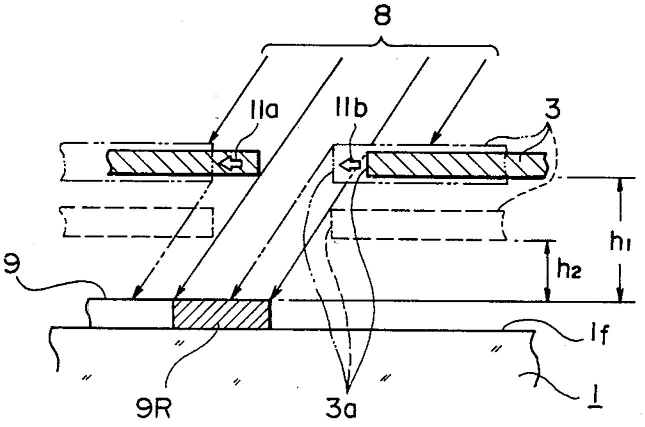
FIG. 19 (PRIOR ART)
FIG. 19 illustrates mislanding of an electron beam.

The reinforcing plate 60 is dimensionally so selected that its transverse width in the direction of depth of the mask 2 or in the Z-direction of the tube axis becomes greater than that of the frame members 4A and 4B. In this case, the heat radiation effect from the frame 4 is enhanced in accordance with increase of the length of forward projection from the frame members 4A, 4B or the length of backward projection therefrom, so that a temperature difference or a thermal expansion difference is induced between the front and rear regions of the reinforcing plate 60. It is necessary, therefore, to pay sufficient attention so as not to bring about undesirable curve in the surface direction of the reinforcing plate. In the constitution mentioned above, any external vibration to the electron beam selection mask 2 can be effectively averted by properly selecting the relationship between the elasticity constant of the springs 161, 162 and that of the frame 4. Furthermore, mislanding of the electron beam can be prevented by devising a four-point support structure where pairs of springs 161 and 162 with the aforementioned first and second rotary mechanisms 51 and 52 are disposed on the two mutually opposed horizontal members 4A and 4B of the frame 4. The operation of this structure will be described below with reference to FIG. 11, which partially shows one of the mutually opposed horizontal members of the frame 4. Suppose now that the frame 4 expands leftward and rightward as indicated by chain lines due to temperature rise from the state shown by solid lines. Then, the distance between anchor points S1 and S2 of the pair of springs 161 and 162 is widened leftward and rightward, whereby the first and second rotary mechanisms 51 and 52 are shifted leftward and rightward with rotation. In this stage, the frame 4 is displaced toward the front surface lf of the panel 1 if the stroke between the first and second rotary mechanisms 51 and 52 and the stroke between the anchor points S1 and S2 are maintained to be substantially fixed with regard to the springs 161 and 162. Accordingly the anchor points S1 and S2 are shifted to positions S1' and S2' respectively, whereby the frame 4 is displaced from the solid-line position of its initial bar height h1 to the position of a smaller bar height h2. In other words, the centers of rotation of the first and second rotary mechanisms 51 and 52 are rotated orthogonally to the direction of adjustment of the bar height. And in the constitution so contrived that a required change of the bar height is obtained by selectively determining the stroke length of the springs 161, 162 and the positional relationship between the stud pins 151, 152 and the springs 161, 162, it becomes possible to execute proper adjustment of the bar height for prevention of mislanding of the electron beam as described in connection with FIG. 19. Since the horizontal members 4A and 4B of the frame 4 are reinforced in the Z-direction with the plates 60 to have a great elasticity constant, the second rotary mechanisms 52 of the springs 161 and 162 function effectively to ensure certain adjustment of the bar height. If the horizontal members 4A and 4B of the frame 4 have a small elasticity constant, such members 4A and 4B are flexed upon occurrence of temperature rise as represented by a broken line in FIG. 12 prior to the rotational function of the springs 161 and 162, whereby the bar height adjustment is impaired.

Figure 14A:
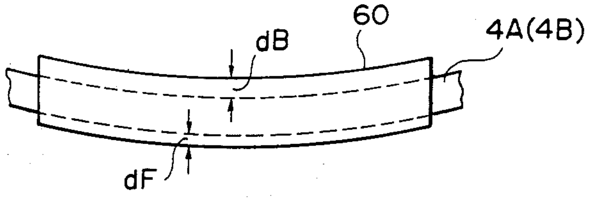
FIGS. 14A and 14B illustrate the relationship between a reinforcing plate and a frame respectively.
Figure 14B:
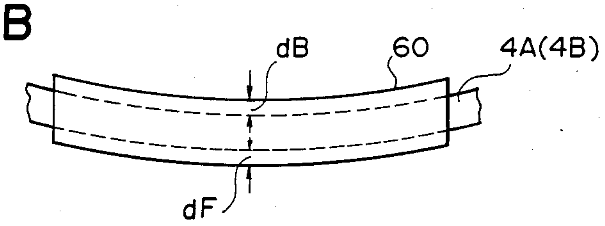
Figure 15:
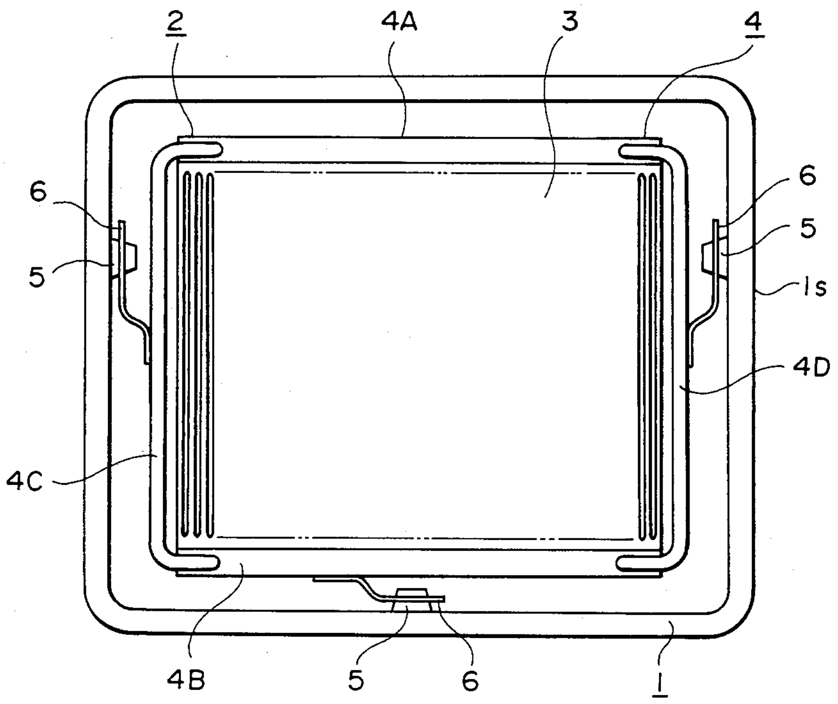
FIG. 15 (PRIOR ART)
FIG. 15 is a rear view showing conventional attachment of a known electron beam selection mask.
Figure 16:
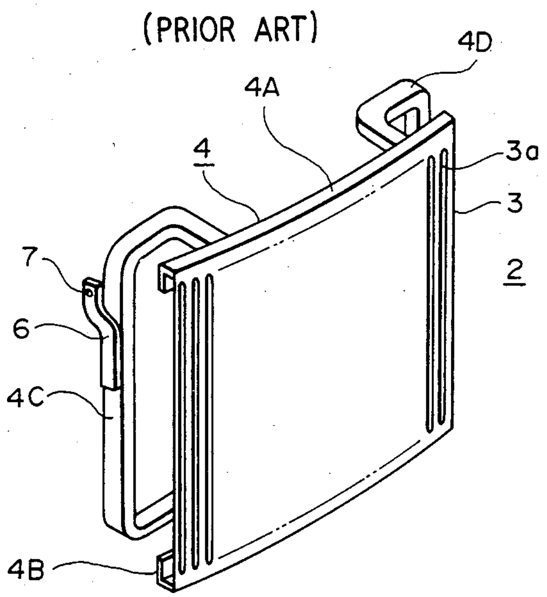
FIG. 16 (PRIOR ART)
FIG. 16 is a perspective view of the electron beam selection mask shown in FIG. 15.
Figure 17:
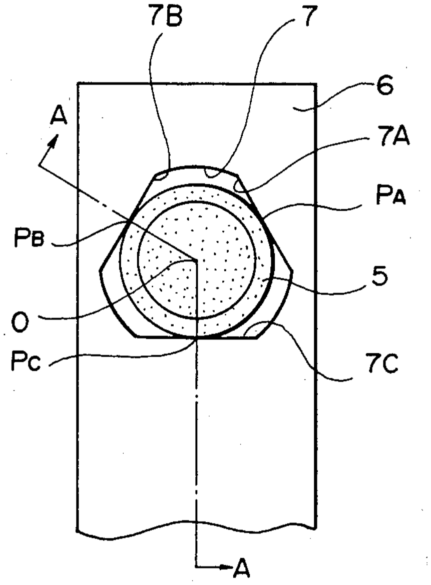
FIG. 17 (PRIOR ART)
FIG. 17 is a plan view showing engagement of the stud pin with the support spring in FIG. 16.
Figure 18:
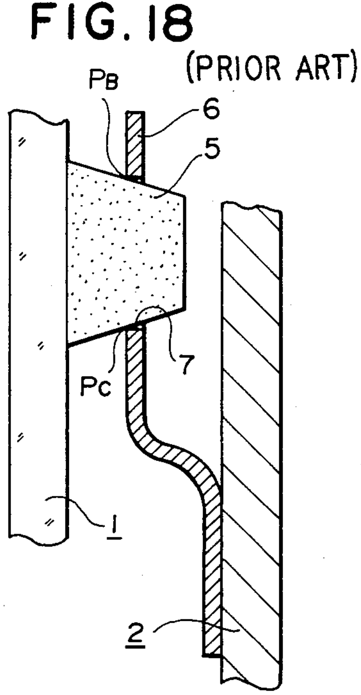
FIG. 18 (PRIOR ART)
FIG. 18 is a sectional view taken along the line A—A in FIG. 17.

Also with regard to the bar height adjustment function, it is necessary that the action based on the difference of the heat radiation effect be taken into consideration when determining the forward and backward projection lengths of the reinforcing plate 60 from the horizontal frame members 4A and 4B. For example, when the forward and backward projection lengths dF and dB of the reinforcing plates 60 from the frame members 4A and 4B have a relationship dF<<dB as shown in FIG. 14A, the amount of heat radiation in the rear region becomes greater so that the temperature in the rear region is rendered lower than the temperature in the front region, whereby the front-region thermal expansion in the frame members 4A and 4B becomes greater than the rear-region thermal expansion together with the reinforcing plate 60 to consequently cause such deformation that the frame members 4A and 4B are further curved. As a result, there occurs the same action as the effect shown by a chain line in FIG. 12 to eventually impair the bar height adjustment function. Therefore, regarding the reinforcing plate 60, it is necessary to take such heat radiation effect into account. For example, as shown in FIG. 14B, it is desired that the projection lengths dF and dB be so selected as to satisfy the condition dF≃dB.

Besides the aforementioned embodiment where the support springs 16 are anchored to the frame 4 while the stud pins 15 are disposed on the panel 1, the constitution may be so modified as to dispose the stud pins 15 on the frame 4 while disposing the support springs 16 on the panel 1.

It is to be understood that the present invention is not limited to the above-mentioned case of application to a color cathode-ray tube having an aperture grille type electron beam selection mask 2, and it is applicable also to a color cathode-ray tube having some other beam selection means such as a shadow mask.

As described hereinabove, according to the present invention where attachment of the electron beam selection mask 2 to the panel 1 is executed by engagement of stud pins 15 with support springs 16, the positional setting of the mask 2 is achieved by local or point support which is based on the engagement of projections 22 with recesses 23, and any external impact or the like is received in a relatively large area of the abutment through surface contact or line contact between the inner peripheral surface of each cap 21 or the inner peripheral edge of its opening and the peripheral surface of the projection 22, thereby averting a disadvantage of imparting the local shock to the stud pin. In addition to the above, according to the present invention, the mutual contact portions of the projection 22 and the recess 23 are coated with solid lubricant films 32 and 33 composed of gold, silver or boron nitride, so that even under a high vacuum condition, the projection 22 and the recess 23 are mutually engageable with low friction to be consequently smoothened in the relative swing, rotation or shift thereof. Thus, even if any great external impact is applied, it is possible to prevent breakage of the projection 22 that may otherwise be caused by the frictional resistance. And the diameter of the projection 22 need not be enlarged to increase its mechanical strength for the purpose of averting such breakage, hence avoiding an impediment that may be induced to the point support by enlargement of the diameter. Due to the reduced friction between the projection 22 and the recess 23, the relative shift thereof caused by any external impact can be eliminated and the return thereof to the former positions is attainable smoothly, thereby preventing an error which may otherwise be induced in the positional relationship between the electron beam selection mask 2 and the luminescent screen if such return to the former positions is impeded. Consequently, the positional setting can be performed with certainty to avert deterioration of the picture quality that results from color discrepancy or the like based on mislanding of the electron beam, hence ensuring high reliability in the color cathode-ray tube.

Further in the present invention where mutual contact portions of the projection 22 and the recess 23 are coated with solid lubricant films 32 and 33 to reduce the friction therebetween, the materials of the projection 22 and the recess 23 including those of the stud pin 15 and the seat plate 34 in the cap 21 are not restricted by mutual friction coefficients at all and can be so determined as to satisfy various conditions for withstanding high temperature in the process of fixing by frit during manufacture of the cathode-ray tube. And in the case of anchoring the stud pin 15 to the panel 1, some suitable materials can be selected out of those having substantially the same thermal expansion coefficient as that of the glass of the panel 1.

In the aforementioned constitution where the seat plate 34 is forcibly pressed into the cap 21, an air vent 35 formed in the bottom plate 21*c* of the cap 21 is effective to let out air from the space between the seat plate 34 and the cap 21 when pressing the former into the latter, thereby preventing such disadvantages that air is introduced therein to impede the insertion of the seat plate 34 into the cap 21 or some air remaining in the cap 21 is released therefrom into the cathode-ray tube after completion of the tube as a product and lowers the degree of vacuum to eventually shorten its service life.

Besides the above, a metal ball 54 is interposed and retained between the two recesses 53 and 23 which are formed in the stud pin and the cap 21 provided on the support spring engaged with the stud pin, so that even a heavy-weight electron beam selection mask 2 can be supported stably without causing breakage of the projection in the structure described in connection with FIGS. 3 and 10.

Furthermore, according to the above-mentioned constitution of the present invention where reinforcing plates 60 are joined to the frame 4 of the electron beam selection mask 2, the elasticity constant of the frame 4 can be selected with a high degree of freedom in relation to the elasticity constant of the springs 161 and 162, so that the degree of freedom in selecting the elasticity constant of the springs 161 and 162 is enhanced to eventually ensure prevention of shake that may otherwise be induced in the beam selection electrode 3 by any vibration of a speaker or the like, hence averting shake of the electron beam transmission apertures 3*a* and mislanding of the electron beam to realize high-quality picture without any color discrepancy or instability. In addition, there is no necessity of increasing the tension so much to support the electrode 3 between the horizontal members 4A and 4B of the frame 4 for prevention of such shake. Consequently, the need to increase the mechanical strength of the frame 4 for attaining a greater tension can be eliminated to avoid undesired increase in both dimensions and weight, thereby accomplishing a light-weight and small-sized structure.

What is claimed is:

1. A color cathode-ray tube having an electron beam selection mask disposed through springs in a panel opposite to a color luminescent screen formed on the inner surface of said panel, said mask including an electron beam selection electrode composed of a thin metal plate with an array of electron beam transmission apertures and attached to a frame with tension, wherein positioning stud pins are fixed to said panel at points for attachment of said electron beam selection mask, and support springs to be engaged with said stud pins are anchored to said frame, each support spring having a cap engageable with the corresponding stud pin so as to cover the top of said stud pin, and a gap is formed about the entire periphery between said stud pin and the side wall of said cap, in the state of engagement.

2. The color cathode-ray tube as defined in claim 1, wherein a projection is formed on the top of each pin, while a recess is formed in said cap for engagement with said projection in the direction orthogonal to the action of said support spring.

3. The color cathode-ray tube as defined in claim 1, wherein a first recess is formed in the top of each stud pin while a second recess is formed in the bottom of each cap at a position opposed to said first recess, and a metal ball is retained between said two recesses.

4. The color cathode-ray tube as defined in claim 2, wherein the mutual contact portions of said projection and said recess are coated with solid lubricant films.

5. The color cathode-ray tube as defined in claim 1, wherein pairs of support springs are anchored to mutually opposed members of said frame in such a manner that the two springs forming each pair are positioned symmetrically with respect to the center of each frame member and said pairs are positioned symmetrically with respect to the center of said frame; said springs being engaged, at the respective free ends, with stud pins disposed at the corresponding positions in said panel, thereby attaching said electron beam selection mask to said panel; and the elasticity constant between the anchor point of each spring on said frame and the point of engagement of each spring with said stud pin is selectively set to be smaller than the elasticity constant between the anchor points of each pair of the springs on the common member of said frame with respect to each of the Y-direction, the Z-direction of the tube axis and the X-direction orthogonal to said Y- and Z-directions.

6. The color cathode-ray tube as defined in claim 5, wherein rotary mechanisms relative to said springs are formed to be individually rotatable in the vicinity of each stud pin and also in the vicinity of the anchor point of each spring on said frame members, and said rotary mechanisms relative to said springs are rotated in accordance with thermal expansion of said frame, so that said frame is shifted toward the panel surface having a color luminescent screen thereon.

7. The color cathode-ray tube as defined in claim 5, wherein reinforcing plates having the same thermal expansion coefficient as that of said frame are joined to the lateral surfaces of said frame, and the transverse width of said reinforcing plate is selectively set to be greater than that of said frame, whereby the elasticity constant of said frame is adjusted.

* * * * *